US012750779B2

(12) United States Patent
Zhao et al.

(10) Patent No.: US 12,750,779 B2
(45) Date of Patent: Sep. 29, 2026

(54) ENERGY-SAVING INDICATION METHOD AND APPARATUS THEREOF

(71) Applicant: DATANG MOBILE COMMUNICATIONS EQUIPMENT CO., LTD., Beijing (CN)

(72) Inventors: Zheng Zhao, Beijing (CN); Jiaqing Wang, Beijing (CN); Meiying Yang, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 637 days.

(21) Appl. No.: 17/635,995

(22) PCT Filed: Aug. 6, 2020

(86) PCT No.: PCT/CN2020/107572

§ 371 (c)(1),
(2) Date: Feb. 16, 2022

(87) PCT Pub. No.: WO2021/031872

PCT Pub. Date: Feb. 25, 2021

(65) Prior Publication Data

US 2022/0286966 A1 Sep. 8, 2022

(30) Foreign Application Priority Data

Aug. 16, 2019 (CN) ......................... 201910760901.3

(51) Int. Cl.
*H04W 52/02* (2009.01)
*H04W 72/23* (2023.01)

(52) U.S. Cl.
CPC ... *H04W 52/0235* (2013.01); *H04W 52/0219* (2013.01); *H04W 52/0232* (2013.01); *H04W 72/23* (2023.01)

(58) Field of Classification Search
CPC ......... H04W 52/0235; H04W 52/0219; H04W 52/0232; H04W 72/23; H04W 52/0216;
(Continued)

(56) References Cited

U.S. PATENT DOCUMENTS

2018/0332655 A1* 11/2018 Ang .................. H04W 52/0216
2019/0053159 A1* 2/2019 Wei ................... H04W 52/0216
(Continued)

FOREIGN PATENT DOCUMENTS

CN 103636264 A 3/2014
CN 108781133 A 11/2018
(Continued)

OTHER PUBLICATIONS

Intel Corporation,"Considerations on PDCCH-based power saving signal", 3GPP TSG-RAN WG1 #97, Reno, USA, May 13-17, 2019, total 11 pages, R1-1906819.
(Continued)

*Primary Examiner* — Marcos L Torres
(74) *Attorney, Agent, or Firm* — KILPATRICK TOWNSEND & STOCKTON LLP

(57) ABSTRACT

Disclosed by the present application are an energy-saving indication method and an apparatus thereof. In the present application, a base station determines a terminal that needs to wake up; and when there is a terminal needs to wake up, in a PDCCH detection opportunity configured for the terminal, the base station sends wake-up indication information to the terminal by means of a PDCCH. In the PDCCH detection opportunity configured for the terminal, the terminal receives by means of the PDCCH the wake-up indication information sent by the base station, and performs PDCCH detection according to the wake-up indication information.

16 Claims, 3 Drawing Sheets

(58) Field of Classification Search
CPC ........... H04W 52/0229; H04W 52/028; H04W 76/28; H04W 68/00; H04W 72/232; Y02D 30/70
See application file for complete search history.

(56) References Cited

U.S. PATENT DOCUMENTS

| | | | | |
|---|---|---|---|---|
| 2019/0363843 | A1* | 11/2019 | Gordaychik | H04W 72/044 |
| 2020/0029302 | A1* | 1/2020 | Cox | H04W 52/0216 |
| 2020/0037396 | A1* | 1/2020 | Islam | H04W 52/0229 |
| 2020/0045631 | A1* | 2/2020 | Vyas | H04L 5/0048 |
| 2021/0136827 | A1* | 5/2021 | Xiong | H04W 74/004 |
| 2022/0039009 | A1* | 2/2022 | Iyer | H04L 5/0098 |
| 2024/0056276 | A1* | 2/2024 | Pelletier | H04L 1/1657 |

FOREIGN PATENT DOCUMENTS

| | | | |
|---|---|---|---|
| CN | 109155972 | A | 1/2019 |
| CN | 109451843 | A | 3/2019 |
| EP | 3509368 | A1 | 1/2019 |
| WO | 2018203822 | A1 | 11/2018 |
| WO | 2019030079 | A1 | 2/2019 |

OTHER PUBLICATIONS

Sony,“Issues related to PDCCH based power saving channel”, 3GPP TSG RAN WG1 #97, Reno, USA, May 13-17, 2019, total 11 pages, R1-1906856.

Qualcomm Incorporated,“PDCCH-based power saving channel design”, 3GPP TSG-RAN WG1 #97,Reno, USA, May 13-17, 2019, total 16 pages, R1-1907294.

Ericsson,“Design of PDCCH-based power saving signal/channel”, 3GPP TSG-RAN WG1 Meeting #97, Reno, USA, May 13-17, 2019, total 9 pages, Tdoc R1-1907322.

Soheil Rostami et al, “Novel Wake-up Signaling for Enhanced Energy-Efficiency of 5G and beyond Mobile Devices”, total 7 pages, IEEE(Feb. 21, 2019).

* cited by examiner

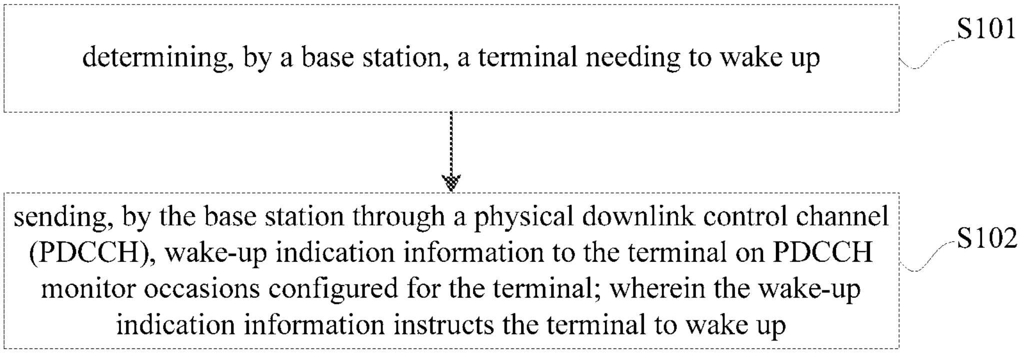

Fig. 1

| DCI bit sequence number | 0 | 1 | 2 | 3 | 4 | 5 | 6 | 7 | 0~M-1 | M~2M-1 | 2M~3M-1 | 3M~4M-1 |
|---|---|---|---|---|---|---|---|---|---|---|---|---|
| Bit value | 0 | 1 | 1 | 1 | 0 | 0 | 1 | 0 | Configuration information of UE1 (Indication information) | Configuration information of UE2 (Indication information) | Configuration information of UE3 (Indication information) | Configuration information of UE6 (Indication information) |

First information field (Wake-up and sleep indication field)

Second information field (Configuration information indication field)

Fig. 2

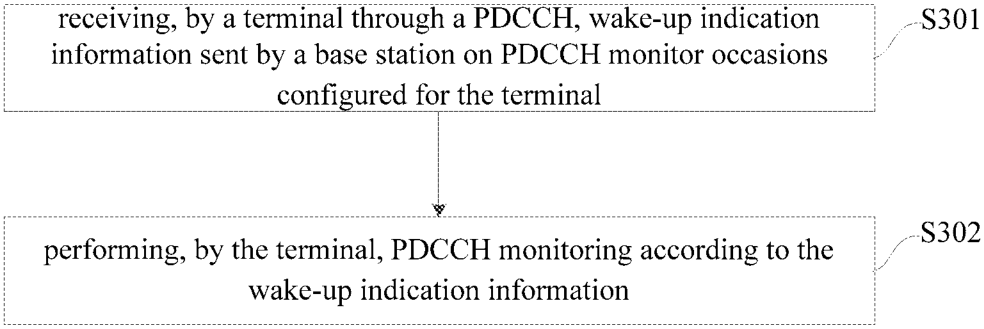

Fig. 3

ENERGY-SAVING INDICATION METHOD AND APPARATUS THEREOF

CROSS REFERENCE TO RELATED APPLICATIONS

The present application is a national phase entry under 35 U.S.C. § 371 of International Application No. PCT/CN2020/107572, filed on Aug. 6, 2020, which claims priority to the Chinese Patent Application No. 201910760901.3, filed to the China National Intellectual Property Administration on Aug. 16, 2019, and entitled "ENERGY-SAVING INDICATION METHOD AND APPARATUS THEREOF", the entire contents of which are incorporated herein by reference.

FIELD

The present application relates to the field of wireless communication, in particular to an energy-saving indication method and an apparatus thereof.

BACKGROUND

In a 5G NR system, in order to obtain downlink scheduling information, a terminal needs to perform monitoring on a physical downlink control channel (PDCCH) on each PDCCH monitor occasion to determine whether there is user scheduling information transmitted. One PDCCH monitor occasion corresponds to a time length, for example, a time length of several symbols.

A base station does not send the user scheduling information through the PDCCH on most of PDCCH monitor occasions. For example, under the condition that discontinuous reception (DRX) is configured for the terminal, one DRX cycle includes an active period and an inactive period, there is no scheduling information transmitted in the inactive period in the DRX cycle, and the terminal performs monitoring on the PDCCH only in the active period of DRX. In the DRX cycle, the terminal is enabled to enter deep sleep, and power consumption of the terminal is lower than that of PDCCH monitoring when the terminal is in deep sleep.

As whether there is data scheduling in each DRX cycle changes dynamically, the base station cannot indicate, through high-level signaling, whether there is scheduling information transmitted in each DRX cycle.

SUMMARY

Embodiments of the present application provide an energy-saving indication method and an apparatus thereof to indicate to wake up a terminal through a PDCCH to perform monitoring on the PDCCH.

The embodiments of the present application provide an energy-saving indication method, including: determining, by a base station, a terminal needing to wake up; and sending, by the base station through a PDCCH, wake-up indication information to the terminal on PDCCH monitor occasions configured for the terminal, and the wake-up indication information instructs the terminal to wake up.

In one embodiment, the determining, by the base station, the terminal needing to wake up includes: determining, by the base station, the terminal needing to wake up in a terminal group; and the sending, by the base station and through the PDCCH, the wake-up indication information to the terminal on the PDCCH monitor occasions configured for the terminal includes: sending, by the base station through the PDCCH, the wake-up indication information to the terminal needing to wake up in the terminal group on PDCCH monitor occasions configured for the terminal group.

In one embodiment, the method further includes: determining, by the base station, a terminal needing to sleep in the terminal group; and sending, by the base station through the PDCCH, Go-To-Sleep (GTS) indication information to the terminal needing to sleep in the terminal group on the PDCCH monitor occasions configured for the terminal group, and the GTS indication information instructs the terminal needing to sleep to sleep.

In one embodiment, the sending the GTS indication information to the terminal needing to sleep in the terminal group through the PDCCH includes: sending, by the base station through the PDCCH, first downlink control information (DCI) and second DCI to the terminals in the terminal group; and the first DCI includes a first information field, the first information field includes subfields, each subfield corresponds to one or more terminals in the terminal group, a value of a subfield to which the terminal needing to wake up corresponds is equal to a value of the wake-up indication information, and a value of a subfield to which the terminal needing to sleep corresponds is equal to a value of the GTS indication information; and

- the second DCI includes a second information field, the second information field includes subfields, a quantity of subfields included in the second information field is smaller than or equal to a quantity of the terminal needing to wake up in the terminal group, each subfield in the second information field corresponds to one or more terminals needing to wake up in the terminal group, and the each subfield is configured to carry indication information of resource information configured for the one or more terminals needing to wake up.

In one embodiment, the base station sends the first DCI and the second DCI by using different aggregation levels.

In one embodiment, the determining, by the base station, the terminal needing to wake up includes: determining, by the base station for at least one terminal group, all terminals in the at least one terminal group needing to wake up, or all terminals in the at least one terminal group needing to sleep; and the sending, by the base station through the PDCCH, the wake-up indication information to the terminal includes: sending, by the base station through the PDCCH, a first DCI to the terminals in the at least one terminal group;

- the first DCI includes a first information field, the first information field includes at least one subfield, one subfield corresponds to one terminal group in the at least one terminal group, at least two subfields in the first information field carry the wake-up indication information or the GTS indication information, the wake-up indication information carried by one subfield instructs all the terminals in a terminal group corresponding to the one subfield to wake up, and the GTS indication information carried by another one subfield instructs all the terminals in a terminal group corresponding to the another one subfield to sleep.

In one embodiment, the method further includes: sending, by the base station, indication information of a quantity of DRX cycles on the PDCCH monitor occasions configured for the terminal.

The embodiments of the present application provide an energy-saving indication method, including: receiving, by a terminal through a PDCCH, wake-up indication information sent by a base station on PDCCH monitor occasions configured for the terminal; and performing, by the terminal, PDCCH monitoring according to the wake-up indication information.

In one embodiment, the method further includes: giving up, by the terminal, PDCCH monitoring in the following one or more DRX cycles if the terminal does not receive, through the PDCCH, the wake-up indication information and/or GTS indication information sent by the base station on the PDCCH monitor occasions configured for the terminal.

In one embodiment, the method further includes: receiving, by the terminal through the PDCCH, GTS indication information sent by the base station on the PDCCH monitor occasions configured for the terminal; and giving up, by the terminal, PDCCH monitoring in the following one or more DRX cycles according to the GTS indication information.

In one embodiment, the terminal is a terminal in a terminal group; and the receiving, through the PDCCH, the wake-up indication information sent by the base station includes: obtaining, by the terminal according to its location in the terminal group to which the terminal belongs, the wake-up indication information carried by a subfield in a first information field of first DCI sent by the base station through the PDCCH;

the first DCI includes the first information field, the first information field includes subfields, each subfield corresponds to one terminal in the terminal group, a value of a subfield to which a terminal needing to wake up corresponds is equal to a value of the wake-up indication information, and a value of a subfield to which a terminal needing to sleep corresponds is equal to a value of GTS indication information.

In one embodiment, the method further includes: receiving, by the terminal through the PDCCH, indication information of resource information configured for the terminal and sent by the base station on the PDCCH monitor occasions configured for the terminal, and performing, by the terminal, configuration according to the indication information of the resource information.

In one embodiment, the method further includes: receiving, by the terminal through the PDCCH, indication information of a quantity of discontinuous reception (DRX) cycles sent by the base station on the PDCCH monitor occasions configured for the terminal, and monitoring, by the terminal, the PDCCH in a corresponding quantity of the following DRX cycles according to the indication information of the quantity of the DRX cycles.

The embodiments of present application provide a base station, including: a processing device, configured to determine a terminal needing to wake up; and a sending device, configured to send wake-up indication information to the terminal through a physical downlink control channel (PDCCH) on PDCCH monitor occasions configured for the terminal; the wake-up indication information instructs the terminal to wake up.

In one embodiment, the processing device is configured to: determine the terminal needing to wake up in a terminal group; and the sending device is configured to: send, through the PDCCH, the wake-up indication information to the terminal needing to wake up in the terminal group on the PDCCH monitor occasions configured for the terminal group.

In one embodiment, the processing device is further configured to: determine a terminal needing to sleep in the terminal group; and the sending device is further configured to: send, through the PDCCH, GTS indication information to the terminal needing to sleep in the terminal group on the PDCCH monitor occasions configured for the terminal group; the GTS indication information instructs the terminal needing to sleep to sleep.

In one embodiment, the sending device is configured to: send, through the PDCCH, first downlink control information (DCI) and second DCI to the terminals in the terminal group; the first DCI includes a first information field, the first information field includes subfields, each subfield corresponds to one or more terminals in the terminal group, a value of a subfield to which the terminal needing to wake up corresponds is equal to a value of the wake-up indication information, and a value of a subfield to which the terminal needing to sleep corresponds is equal to a value of the GTS indication information; and the second DCI includes a second information field, the second information field includes subfields, a quantity of subfields included in the second information field is smaller than or equal to a quantity of terminals needing to wake up in the terminal group, each subfield in the second information field corresponds to one or more terminals needing to wake up in the terminal group, and the each subfield is configured to carry indication information of resource information configured for the one or more terminals needing to wake up.

In one embodiment, the sending device is specifically configured to: send the first DCI and the second DCI by using different aggregation levels.

In one embodiment, the processing device is configured to: determine, for at least one terminal group, all the terminals in the at least one terminal group needing to wake up, or all the terminals in the at least one terminal group needing to sleep; and the sending device is configured to: send, through the PDCCH, a first DCI to the terminals in the at least one terminal group;

the first DCI includes the first information field, the first information field includes at least one subfield, one subfield corresponds to one terminal group in the at least one terminal group, at least two subfields in the first information field carry the wake-up indication information or the GTS indication information, the wake-up indication information carried by one subfield instructs all the terminals in a terminal group corresponding to the one subfield to wake up, and the GTS indication information carried by another one subfield instructs all the terminals in a terminal group corresponding to the another one subfield to sleep.

In one embodiment, the sending device is further configured to: send indication formation of a quantity of discontinuous reception (DRX) cycles on the PDCCH monitor occasions configured for the terminal.

The embodiments of present application provides a terminal, including:

a receiving device, configured to receive, through a PDCCH, wake-up indication information sent by a base station on PDCCH monitor occasions configured for the terminal; and a processing device, configured to perform PDCCH monitoring according to the wake-up indication information.

In one embodiment, the processing device is further configured to: give up PDCCH monitoring in the following one or more DRX cycles if the terminal does not receive, through the PDCCH, the wake-up indication information and/or GTS indication information sent by the base station on the PDCCH monitor occasions configured for the terminal.

In one embodiment, the processing device is further configured to: receive, through the receiving device and the PDCCH, the GTS indication information sent by the base station on the PDCCH monitor occasions configured for the terminal.

In one embodiment, the processing device is further configured to: obtain, according to a location of the terminal in a terminal group to which the terminal belongs, the wake-up indication information carried by a subfield in a first information field of first DCI sent by the base station through the PDCCH;

the first DCI includes the first information field, the first information field includes subfields, each subfield corresponds to one terminal in the terminal group, a value of a subfield to which a terminal needing to wake up corresponds is equal to a value of the wake-up indication information, and a value of a subfield to which a terminal needing to sleep corresponds is equal to a value of the GTS indication information.

In one embodiment, the processing device is further configured to: receive, through the PDCCH, indication information of resource information sent by the base station on the PDCCH monitor occasions configured for the terminal, and perform configuration according to the indication information of the resource information.

The embodiments of present application provide a communication apparatus, including; a processor, a memory and a transceiver. The processor is configured to read a computer instruction in the memory to execute:

determining a terminal needing to wake up; and sending, through the transceiver and a PDCCH, wake-up indication information to the terminal on physical downlink control channel (PDCCH) monitor occasions configured for the terminal; the wake-up indication information instructs the terminal to wake up.

In one embodiment, the processor is further configured to: determine the terminal needing to wake up in a terminal group; and send, through the transceiver and the PDCCH, the wake-up indication information to the terminal needing to wake up in the terminal group on the PDCCH monitor occasions configured for the terminal.

In one embodiment, the processor is further configured to: determine a terminal needing to sleep in the terminal group; and send, through the transceiver and the PDCCH, GTS indication information to the terminal needing to sleep in the terminal group on the PDCCH monitor occasions configured for the terminal group; the GTS indication information instructs the terminal needing to sleep to sleep.

In one embodiment, the processor is further configured to: send, through the transceiver and the PDCCH, first downlink control information (DCI) and second DCI to the terminals in the terminal group; the first DCI includes a first information field, the first information field includes subfields, each subfield corresponds to one terminal in the terminal group, a value of a subfield to which the terminal needing to wake up corresponds is equal to a value of the wake-up indication information, a value of a subfield to which the terminal needing to sleep corresponds is equal to a value of the GTS indication information; and the second DCI includes a second information field, the second information field includes subfields, the quantity of subfields included in the second information field is smaller than or equal to a quantity of terminals needing to wake up in the terminal group, each subfield in the second information field corresponds to one terminal needing to wake up in the terminal group, and the each subfield is configured to carry indication information of resource information configured for the one terminals needing to wake up.

In one embodiment, a base station sends the first DCI and the second DCI by using different aggregation levels.

In one embodiment, the processor is specifically configured to: determine, for at least one terminal group, all terminals in the at least one terminal group needing to wake up, or all terminals in the at least one terminal group needing to sleep; and send, through the transceiver and the PDCCH, a first DCI to the terminals in the at least one terminal group; the first DCI includes a first information field, the first information field includes at least one subfield, one subfield corresponds to one terminal group in the at least one terminal group, at least two subfields in the first information field carry the wake-up indication information or GTS indication information, the wake-up indication information carried by one subfield instructs all the terminals in a terminal group corresponding to the one subfield to wake up, and the GTS indication information carried by another one subfield instructs all the terminals in a terminal group corresponding to the another one subfield to sleep.

In one embodiment, the processor is further configured to: send, through the transceiver, indication information of a quantity of discontinuous reception (DRX) cycles on the PDCCH monitor occasions configured for the terminal.

Some embodiments, provides a communication apparatus, including: a processor, a memory and a transceiver. The processor is configured to read a computer instruction in the memory to execute:

receiving, through the transceiver and a PDCCH, wake-up indication information sent by a base station on physical downlink control channel (PDCCH) monitor occasions configured for a terminal; and performing PDCCH monitoring according to the wake-up indication information.

In one embodiment, the processor is further configured to: give up PDCCH monitoring in the following one or more DRX cycles if the communication apparatus does not receive, through the PDCCH, the wake-up indication information and/or GTS indication information sent by the base station on the PDCCH monitor occasions configured for the terminal.

In one embodiment, the processor is further configured to: receive, through the transceiver and the PDCCH, GTS indication information sent by the base station on the PDCCH monitor occasions configured for the terminal; and give up PDCCH monitoring in the following one or more DRX cycles according to the GTS indication information.

In one embodiment, the processor is specifically configured to: obtain, according to a location of the terminal in a terminal group to which the terminal belongs, the wake-up indication information carried by a subfield in a first information field of first DCI sent by the base station through the PDCCH;

the first DCI includes the first information field, the first information field includes subfields, each subfield corresponds to one terminal in the terminal group, a value of a subfield to which a terminal needing to wake up corresponds is equal to a value of the wake-up indication information, and a value of a subfield to which a terminal needing to sleep corresponds is equal to a value of the GTS indication information.

In one embodiment, the processor is further configured to: receive, through the PDCCH, indication information of resource information sent by the base station on the PDCCH monitor occasions configured for the terminal; and perform configuration according to the indication information of the resource information.

In one embodiment, the processor is further configured to: receive, through the PDCCH, indication information of a quantity of discontinuous reception (DRX) cycles sent by the base station on the PDCCH monitor occasions configured for the terminal; and monitor the PDCCH in a corresponding quantity of the following DRX cycles according to the indication information of the quantity of the DRX cycles.

The embodiments of the present application provide a computer readable storage medium, and the computer readable storage medium stores a computer executable instruction, and the computer executable instruction is configured to make a computer execute any method in the embodiments described above.

The embodiments of the present application provide a computer readable storage medium, and the computer readable storage medium stores a computer executable instruction, and the computer executable instruction is configured to make a computer execute any method in the embodiments described above.

In the above embodiments of the present application, the base station determines the terminal needing to wake up and sends, through the PDCCH, the wake-up indication information to the terminal on the PDCCH monitor occasions configured for the terminal to instruct the terminal to wake up and PDCCH monitoring can be performed, and scheduling information sent by the base station can be received. The embodiments of the present application can effectively send wake-up and Go-To-Sleep (GTS) signals, improve downlink control signaling transmission efficiency and reduce the processing complexity of the base station.

BRIEF DESCRIPTION OF THE DRAWINGS

FIG. 1 is a schematic flowchart of an energy-saving indication method implemented on a base station side provided by an embodiment of the present application.

FIG. 2 is a schematic diagram of DCI in an embodiment of the present application.

FIG. 3 is a schematic flowchart of an energy-saving indication method implemented on a terminal side provided by an embodiment of the present application.

DETAILED DESCRIPTION OF THE EMBODIMENTS

Figure 4:
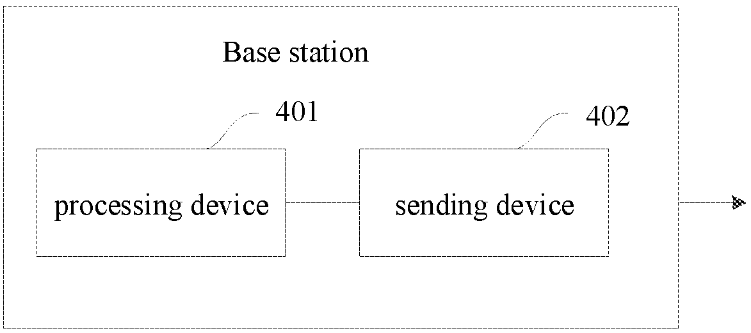
FIG. 4 is a schematic structural diagram of a base station provided by an embodiment of the present application.

The embodiments of the present application provide an energy-saving indication method and an apparatus thereof to indicate a terminal to either perform or not perform PDCCH monitoring and the terminal can, according to an indication of a base station, monitor the PDCCH to guarantee receiving of scheduling information or not monitor the PDCCH to reduce power consumption of the terminal.

(1) "Terminal" in the embodiments of the present application is also called user equipment (UE), a mobile station (MS), a mobile terminal (MT), etc. and is a device for providing voice and/or data connectivity for a user, for example, a hand-held device, an on-board device, etc. with a wireless connection function. At present, examples of some terminals are: a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, etc.

(2) "Base station" in the embodiments of the present application may be an RAN node or a base station. RAN is a portion, making a terminal access into a wireless network, of a network. The RAN node (or device) is a node (or a device) in a radio access network and may be also called the base station. At present, examples of some RAN nodes are: a gNB, a transmission reception point (TRP), an evolved node B (eNB), a radio network controller (RNC), a node B (NB), a base station controller (BSC), a base transceiver station (BTS), a home base station (for example, a home evolved NodeB or a home Node B (HNB)), a base band unit (BBU) or a wireless fidelity (WiFi) access point (AP), etc. Besides, in a type of network structure, the RAN may include a centralized unit (CU) node and a distributed unit (DU) node.

(3) in the embodiments of the present application, indication information configured to instruct the terminal to wake up to perform PDCCH monitoring is called wake-up indication information. The wake-up indication information may be also called wakeup signaling (WUS). The terminal waking up means that the terminal wakes up from a sleep state.

(4) in the embodiments of the present application, indication information configured to instruct the terminal to sleep not to perform PDCCH monitoring is called go-to-sleep (GTS) indication information. The GTS indication information may be also called GTS signaling. The terminal sleeping means that the terminal enters the sleep state.

It should be understood that terms such as "first" and "second" in the embodiments of the present application are used for distinguishing similar objects rather than intend to describe a specific sequence or a precedence order. It should be understood that data used like this are interchangeable under appropriate circumstances, for example, it can be implemented in a sequence besides those illustrated or described in the embodiments of the present application.

The embodiments of the present application are described in detail below with reference to the accompanying drawings.

Referring to FIG. 1, a schematic flowchart of an energy-saving indication method implemented on a base station side provided by an embodiment of the present application, as shown in the figure, a flow may include:

S101: determining, by a base station, a terminal needing to wake up; and

S102: sending, by the base station through a physical downlink control channel (PDCCH), wake-up indication information to the terminal on PDCCH monitor occasions configured for the terminal; and the wake-up indication information instructs the terminal to wake up.

In the above embodiments of the present application, the base station determines the terminal needing to wake up and sends, through the PDCCH, the wake-up indication information to the terminal on the PDCCH monitor occasions configured for the terminal to indicate the terminal to wake up to perform PDCCH monitoring and scheduling information sent by the base station can be received, wake-up and sleep signals can be effectively sent, the downlink control signaling transmission efficiency can be improved, and the processing complexity of the base station can be reduced.

According to the flow shown in FIG. 1, in some embodiments, the base station may further send indication information of the quantity of DRX cycles on the PDCCH monitor occasions configured for the terminal and the terminal can wake up in the corresponding quantity of following continuous DRX cycles to perform PDCCH monitoring.

The terminal in the above flow may be an independent terminal (namely, not a terminal in a configured terminal group), the terminal may be also a terminal in the configured terminal group, and one or more terminals can share the same wake-up and sleep information. Configuration information of the terminal group may be sent by the base station through high-level signaling, and the terminal may obtain the location or sequence number of the terminal (namely, the terminal is which one of terminals in the terminal group to which it belongs) in the terminal group according to the configuration information of the terminal group.

In one embodiment, under the condition that the terminal in the above flow is the independent terminal, the base station may, in an implicit way, indicate the terminal to sleep not to perform PDCCH monitoring. In one embodiment, the above flow may further include the following steps: the base station gives up sending, through the PDCCH, GTS indication information to the terminal on the PDCCH monitor occasions configured for the terminal if the base station determines that the terminal needs to sleep and the terminal can enter a sleep state in the following one or more DRX cycles and does not perform PDCCH monitoring.

In one embodiment, under the condition that the terminal in the above flow is a terminal in the terminal group, the base station may, in the implicit way, indicate all terminals in the terminal group to sleep and PDCCH monitoring is not performed. In one embodiment, the above flow may further include the following steps: the base station gives up sending, through the PDCCH, the GTS indication information to the terminals in the terminal group on the PDCCH monitor occasions configured for the terminal group if the base station determines that all the terminals in the terminal group need to sleep and the terminals in the terminal group enter the sleep state in the following one or more DRX cycles and do not perform PDCCH monitoring.

The terminal may be informed of whether the base station performs indication in an explicit way or the implicit way through high-level signaling.

It may be seen that the base station indicates, in the implicit way, the terminal or all the terminals in the terminal group to sleep and does not need to send, through the PDCCH, the GTS indication information and resource overhead can be reduced, and the terminal may sleep in the following one or more DRX cycles under the condition that the terminal does not receive the GTS indication information in a PDCCH monitoring cycle, and thus energy consumption of the terminal can be reduced. When there are a few terminals in the indicated terminal group, all the terminals need to sleep in most cases, and the embodiments of the present application can reduce the frequency for sending the GTS indication information (also called sleep PDCCH) or the wake-up indication information (also called wake-up PDCCH), can save resources and can reduce the implementation complexity of the base station.

Under the condition that the terminal in the above flow is a terminal in the terminal group, in S101, the base station determines the terminal needing to wake up in the terminal group; and in S102, the base station sends, through the PDCCH, the wake-up indication information to the terminal needing to wake up in the terminal group on the PDCCH monitor occasions configured for the terminal group.

In one embodiment, the base station may also send the GTS indication information to the terminal needing to sleep in the terminal group. In one embodiment, the above flow may further include the following steps: the base station determines the terminal needing to sleep in the terminal group and sends, through the PDCCH, the GTS indication information to the terminal needing to sleep in the terminal group on the PDCCH monitor occasions configured for the terminal group.

The base station may send, through downlink control information (DCI), the wake-up indication information and/or the GTS indication information to the terminal in the terminal group, and thus the terminals in the terminal group share the DCI. In one embodiment, a base station sends first DCI to the terminal in the terminal group, the first DCI includes a first information field, the first information field includes subfields, each subfield corresponds to one or more terminals in the terminal group, a value of a subfield to which the terminal needing to wake up corresponds is equal to a value of the wake-up indication information, and a value of a subfield to which the terminal needing to sleep corresponds is equal to a value of the GTS indication information. One subfield may include one or more bits.

For example, one terminal group includes eight terminals, the DCI sent by the base station includes the first information field, the information field includes eight bits, and each bit corresponds to one terminal in the terminal group and is configured to send the wake-up indication information or the GTS indication information to the corresponding terminal. When a value of one bit is 0, it means that the wake-up indication information is sent to the corresponding terminal, and when a value of one bit is 1, it means that the GTS indication information is sent to another corresponding terminal.

In one embodiment, the base station may further allocate resource information for the terminal needing to wake up and send, through the PDCCH, indication information of the resource information to the terminal needing to wake up.

The resource information may be configuration information related to energy saving of the terminal, and may include, for example, one piece or more pieces of information among the quantity of multi-input multi-output (MIMO) antennae/layers, Scell activation/deactivation indication, activation indication of bandwidth part (BWP), trigger configuration information of aperiodic channel state information (CSI) reporting, sounding reference signal (SRS) trigger configuration information, trigger configuration information of a time reference signal (TRS), etc.

In order to reduce the quantity of DCI bits occupied by the above configuration information, specific configuration information of the resource information configured for the terminal may be sent to the terminal through high-level signaling, a possible value of indication of the resource information is pre-defined through a standard, in this way, when the base station sends, through the PDCCH, the indication information of the resource information to the terminal needing to wake up, the indication information (an index) only needs to be sent to the terminal through the DCI, and thus bit overhead of the DCI is reduced.

In one embodiment, the base station may send, through the first DCI, the indication information of the resource information configured for the terminal needing to wake up to the corresponding terminal, that is, the terminals needing to wake up or sleep are indicated through the same DCI, and the resource information is indicated to the terminal needing to wake up. In another embodiment, the indication information of the resource information configured for the terminal needing to wake up may be also sent, through second DCI, to the corresponding terminal, that is, indication is performed through different pieces of DCI, one piece of DCI is configured to indicate the terminals needing to wake up or sleep, and the other pieces of DCI are configured to indicate the resource information to the terminal needing to wake up.

In the embodiment of sending, through the first DCI, the indication information of the resource information, the first DCI further includes the second information field besides the first information field. The second information field includes subfields, the quantity of subfields is smaller than or equal to the quantity of terminals needing to wake up in the terminal group, each subfield in the second information field corresponds to one terminal needing to wake up in the terminal group, and the each subfield is configured to carry the indication information of the resource information configured for the corresponding terminal needing to wake up.

For example, there are eight terminals in one terminal group, the first terminal (UE1), the second terminal (UE2), the third terminal (UE3) and the sixth terminal (UE6) among the eight terminals need to be awakened, the remaining terminals need to sleep, then the base station sends the DCI, the DCI may be shared by the terminals in the terminal group, and information and a structure included in the DCI and related to the present application may be shown in FIG. 2.

As shown in FIG. 2, the DCI includes the first information field (also called a wake-up and sleep indication field) and the second information field (also called a configuration information indication field). The first information field (wake-up and sleep indication field) includes eight bits, and each bit corresponds to one terminal in the terminal group and is configured to indicate the corresponding terminal to either wake up or sleep. In this example, when a bit value is 0, it means that the corresponding terminal needs to wake up, and when the bit value is 1, it means that the corresponding terminal needs to sleep. In this example, as the bit 1 corresponds to the UE 1 in the terminal group, the bit 2 corresponds to the UE2 in the terminal group, the bit 3 corresponds to the UE3 in the terminal group, and the bit 6 corresponds to the UE6 in the terminal group, values of the eight bits in the first information field are shown in FIG. 2, it means that the wake-up indication information is sent to the UE1, UE2, UE3 and UE6, and the GTS indication information is sent to the remaining UE.

As there are four terminals needing to wake up in the terminal group, the second information field (the configuration information field) in the DCI includes four subfields, and the configuration information is indicated to the four terminals (UE1, UE2, UE3 and UE6) respectively, that is, each subfield carries the indication information of the resource information of the terminal corresponding to each subfield. Each subfield may include M bits (M is an integer larger than or equal to 1).

On a terminal side, the terminal in the terminal group may obtain the value of the corresponding bit in the first information field in the DCI according to a location of the terminal in the terminal group and determine to wake up or sleep according to the value, that is, the terminal determines to either monitor or not monitor the PDCCH in the following one or more DRX cycles. If the terminal determines to wake up, the subfield to which the terminal corresponds is determined in the second information field according to the location of the terminal among all the terminals needing to wake up, the indication information carried by the subfield is read, and thus the resource information configured, by the base station, for the terminal is obtained. For example, as for the UE1, as the UE1 is the first terminal among all the terminals needing to wake up, the UE1 reads the first subfield in the second information field, and as for the UE3, as the UE3 is the third terminal among all the terminals needing to wake up, the UE3 reads the third subfield in the second information field.

In one embodiment, as for the terminals needing to wake up in one terminal group, in order to enable the terminal to determine which one of the terminals needing to wake up in this terminal group it is, thus a location, in the second information field, of the subfield to which the terminal corresponds is determined, the base station may send, to the terminal, indication information of which one of the terminals needing to wake up in this terminal group it is, or send, to the terminal, indication information of how many terminals needing to wake up before the terminal.

In one embodiment, under the condition that there are many terminals needing to wake up, the second information field in the DCI may not carry indication information of the resource information of all the terminals needing to wake up. In this case, in the embodiments of the present application, the indication information of the resource information of part of terminals among all the terminals needing to wake up in the terminal group may be carried in the second information field in the DCI, and the indication information of the resource information of the remaining terminals needing to wake up may be indicated through other DCI. The other DCI may be user-specific or based on the terminal group (that is, may be shared by terminals in the terminal group).

In one embodiment, in the first information field of the DCI, one subfield may also correspond to terminals, and terminals may share the wake-up indication information or the GTS indication information carried by the one subfield.

Furthermore, if the base station sends the first DCI and the second DCI, the first DCI and the second DCI may be transmitted by using different aggregation levels. As the first DCI is configured to send the wake-up indication information and/or the GTS indication information, the wake-up indication information and GTS indication information are higher in requirement for reliability and need the fixed quantity of bits, and being transmitted by using a high aggregation level.

In another embodiment, each subfield in the first information field in the first DCI may also correspond to one terminal group, for example, the first information field includes eight bits, and each bit corresponds to one terminal group and is configured to indicate all the terminals in the one terminal group to wake up or sleep. In this way, the terminals in terminal groups may share the DCI, and resource overhead can be reduced compared with that of sending the DCI to these terminal groups or the terminals in the terminal group respectively.

Referring to FIG. 3, a schematic flowchart of an energy-saving indication method implemented on a terminal side provided by the embodiments of the present application, as shown in the figure, a flow may include:

S301: receiving, by a terminal through a PDCCH, wake-up indication information sent by a base station on PDCCH monitor occasions configured for the terminal; and

S302: performing, by the terminal, PDCCH monitoring according to the wake-up indication information.

In one embodiment, in some embodiments, the base station may further send indication information of the quantity of DRX cycles on the PDCCH monitor occasions configured for the terminal. Correspondingly, the terminal may receive the indication information on the PDCCH monitor occasions configured for the terminal and then wake up in the corresponding quantity of the following continuous DRX cycles according to the indication information to perform PDCCH monitoring.

In one embodiment, in some embodiments, the method further includes: the terminal gives up PDCCH monitoring in the following one or more DRX cycles if the terminal does not receive, through the PDCCH, the wake-up indication information and/or GTS indication information sent by the base station on the PDCCH monitor occasions configured for the terminal. In this way, indicating the terminal to sleep may be realized in an implicit way and resource overhead can be reduced and energy consumption of the terminal can be reduced.

In one embodiment, in some embodiments, the terminal may further receive, through the PDCCH, the GTS indication information sent by the base station on the PDCCH monitor occasions configured for the terminal. The terminal gives up PDCCH monitoring in the following one or more DRX cycles according to the GTS indication information. In this way, indicating the terminal to sleep may be realized in an explicit way.

In one embodiment, if the terminal is a terminal in the terminal group, a process that the terminal receives, through the PDCCH, the wake-up indication information sent by the base station may include: the terminal obtains, according to its location in the terminal group to which the terminal belongs, the wake-up indication information carried by a corresponding subfield in a first information field of the first DCI sent by the base station through the PDCCH. In this way, sharing, by terminals in one terminal group, the DCI may be realized to obtain the wake-up indication information or the GTS indication information.

In one embodiment, the terminal may further receive, through the PDCCH, indication information of resource information sent by the base station and configured for the terminal on the PDCCH monitor occasions configured for the terminal and perform configuration according to the indication information of the resource information.

The present application further provides some embodiments, whether the terminal in the terminal group wakes up or sleeps may be indicated in the implicit way by using a demodulation reference signal (DMRS) sequence sent by a PDCCH region. In one embodiment, it may be pre-determined that one DMRS sequence corresponds to wake-up indication, and the other DMRS sequence corresponds to sleep indication. As for one terminal group, if all the terminals in the terminal group need to wake up, DMRS transmission may be performed by using the DMRS sequence corresponding to wake-up indication, and the terminals in the terminal group can execute wake-up processing after detecting the DMRS sequence corresponding to wake-up indication (that is, performing PDCCH monitoring in the following one or more DRX cycles). In one embodiment, if all the terminals in the terminal group need to sleep, DMRS transmission may be performed by using the DMRS sequence corresponding to sleep indication, and the terminals in the terminal group can execute sleep processing after detecting the DMRS sequence corresponding to sleep indication (that is, not performing PDCCH monitoring in the following one or more DRX cycles.)

The present application further provides some embodiments, whether it is sleep indication may be recognized according to a PDCCH sequence. If PDCCH-scrambled PS-RNTI for transmitting the wake-up indication information and/or GTS indication information corresponds to different terminals, scrambling values are different, that is, if all the terminals in the terminal group are indicated, through the PDCCH, to sleep, a sequence composed of PDCCH coding is different from a PDCCH coding sequence in other cases (the other cases refer to that at least one terminal in the terminal group needs to wake up), for the sake of convenient description, it is called a sleep PDCCH sequence here. Therefore, if the terminal in the terminal group detects that the PDCCH sequence is the sleep PDCCH sequence, it may be determined that the base station indicates the terminal to sleep, and the terminal does not need to perform decoding on the sleep PDCCH sequence. By means of this method, detection complexity can be reduced, the sleep indication can be rapidly recognized, and when the terminals need to sleep in most cases, processing overhead of the terminals can be reduced by means of the embodiment.

The present application further provides some embodiments, multi-terminal joint indication may be performed in the DCI for sending the wake-up indication information and/or the GTS indication information and DCI overhead can be reduced, or the DCI can carry more indication information. In one embodiment, under the condition that the DCI includes indication information of the quantity of DRX cycles, various combination conditions of the quantity of DRX cycles in which different terminals need to wake up or sleep can be jointly coded respectively, thus, the quantity of DRX cycles in which terminals wake up or sleep may be indicated through a coding value or an index value (the coding value indicates the quantity of DRX cycles in which the terminals need to wake up or sleep under a combination condition) instead of indicating the quantity of DRX cycles for each terminal waking up or sleeping. The quantity of DRX cycles in which all the terminals wake up or sleep under each combination condition may be configured, by the base station, to the terminals through high-level signaling.

It may be seen from the above description that the present application provides a method of wake-up indication and sleep indication, through joint design of the wake-up indication information and/or the GTS indication information and other configuration information related to an energy-saving function, these information can be shared among users, the utilization ratio of the DCI is increased, the resource utilization ratio is further increased, and the user detection power consumption is reduced. The indication method provided by the embodiments of the present application may indicate the terminal to wake up or sleep in the explicit way or the implicit way, and a system may configure explicit or implicit indication according to actual demands, the utilization ratio of the DCI is increased, and the detection accuracy is improved.

Embodiments of the present application further provide a base station.

Referring to FIG. 4, a schematic structural diagram of a base station provided by the embodiments of the present application. The base station may include: a processing device 401 and a sending device 402.

The processing device 401 is configured to determine a terminal needing to wake up.

The sending device 402 is configured to send, through a PDCCH, wake-up indication information to the terminal on PDCCH monitor occasions configured for the terminal, and the wake-up indication information instructs the terminal to wake up.

In one embodiment, the processing device 401 is configured to: determine the terminal needing to wake up in a terminal group; the sending device 402 is configured to: send, through the PDCCH, the wake-up indication information to the terminal needing to wake up in the terminal group on the PDCCH monitor occasions configured for the terminal group.

In one embodiment, the processing device 401 is further configured to: determine a terminal needing to sleep in the terminal group; the sending device 402 is further configured to: send, through the PDCCH, GTS indication information to the terminal needing to sleep in the terminal group on the PDCCH monitor occasions configured for the terminal group, and the GTS indication information instructs the terminal needing to sleep to sleep.

In one embodiment, the sending device 402 is configured to: send, through the PDCCH, first downlink control information (DCI) and second DCI to the terminals in the terminal group. The first DCI includes a first information field, the first information field includes subfields, each subfield corresponds to one or more terminals in the terminal group, a value of a subfield to which the terminal needing to wake up corresponds is equal to a value of the wake-up indication information, a value of a subfield to which the terminal needing to sleep corresponds is equal to a value of the GTS indication information, the second DCI includes a second information field, the second information field includes subfields, the quantity of subfields included in the second information field is smaller than or equal to the quantity of terminals needing to wake up in the terminal group, each subfield in the second information field corresponds to one or more terminals needing to wake up in the terminal group, and the each subfield is configured to carry indication information of resource information configured for the one or more terminals needing to wake up.

In one embodiment, the sending device 402 is configured to: send the first DCI and the second DCI by using different aggregation levels.

In one embodiment, the processing device 401 is specifically configured to: determine, for at least one terminal group, all the terminals in the at least one terminal group needing to wake up, or all the terminals in the at least one terminal group needing to sleep.

The sending device 402 is configured to: send, through the PDCCH, a first DCI to the terminals in the at least one terminal group.

The first DCI includes a first information field, the first information field includes at least one subfield, one subfield corresponds to one terminal group in the at least one terminal group, the at least two subfields in the first information field carry the wake-up indication information or the GTS indication information, the wake-up indication information carried by one subfield instructs all the terminals in a terminal group corresponding to the one subfield to wake up, and the GTS indication information carried by another one subfield instructs all the terminals in a terminal group corresponding to the another one subfield to sleep.

In one embodiment, the sending device 402 is further configured to: send indication information of a quantity of discontinuous reception (DRX) cycles on the PDCCH monitor occasions configured for the terminal.

Embodiments of the present application further provide a terminal.

Figure 5:
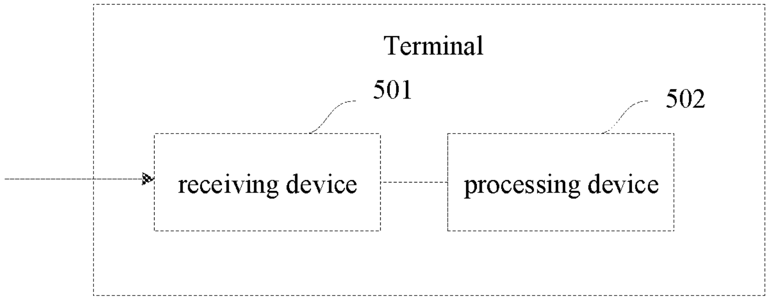
FIG. 5 is a schematic structural diagram of a terminal provided by an embodiment of the present application.

Referring to FIG. 5, a schematic structural diagram of a terminal provided by the embodiments of the present application. The terminal may include: a receiving device 501 and a processing device 502.

The receiving device 501 is configured to receive, through a PDCCH, wake-up indication information sent by a base station on PDCCH monitor occasions configured for the terminal; the processing device 502 is configured to perform PDCCH monitoring according to the wake-up indication information.

In one embodiment, the processing device 502 is further configured to: give up PDCCH monitoring in the following one or more DRX cycles if the receiving device 501 does not receive, through the PDCCH, the wake-up indication information and/or GTS indication information sent by the base station on the PDCCH monitor occasions configured for the terminal.

In one embodiment, the receiving device 501 is further configured to: receive, through the PDCCH, the GTS indication information sent by the base station on the PDCCCH monitor occasions configured for the terminal; the processing device 502 is further configured to: give up PDCCH monitoring in following one or more DRX cycles according to the GTS indication information.

In one embodiment, the terminal is a terminal in the terminal group; the receiving device 501 is configured to: obtain, according to a location of the terminal in a terminal group to which the terminal belongs, the wake-up indication information carried by a subfield in a first information field of first DCI sent by the base station through the PDCCH, and the first DCI includes the first information field, the first information field includes subfields, each subfield corresponds to one terminal in the terminal group, a value of a subfield to which a terminal needing to wake up corresponds is equal to a value of the wake-up indication information, and a value of a subfield to which a terminal needing to sleep corresponds is equal to a value of the GTS indication information.

In one embodiment, the receiving device 501 is further configured to: receive, through the PDCCH, indication information of resource information sent by the base station on the PDCCH monitor occasions configured for the terminal; and perform configuration according to the indication information of the resource information.

In one embodiment, the receiving device 501 is further configured to: receive, through the PDCCH, indication information of the quantity of discontinuous reception (DRX) cycles sent by the base station; and monitor the PDCCH in the corresponding quantity of following DRX cycles according to the indication information of the quantity of DRX cycles.

Embodiments of the present application further provide a communication apparatus.

Figure 6:
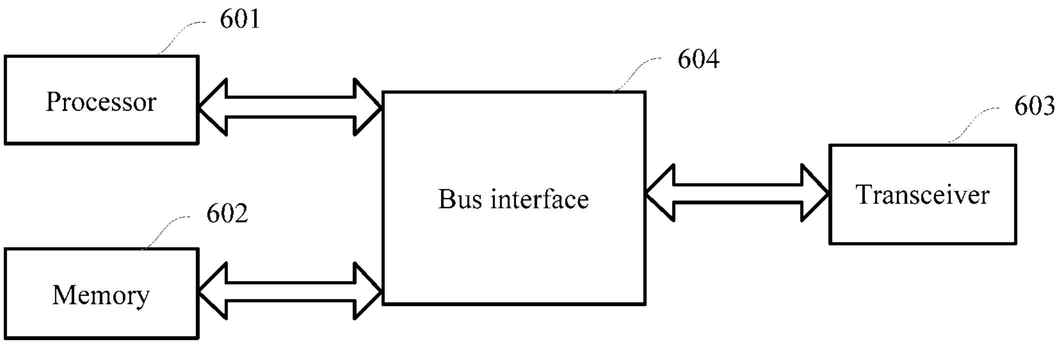
FIG. 6 is a schematic structural diagram of a communication apparatus provided by an embodiment of the present application.

FIG. 6 exemplarily illustrates a schematic structural diagram of a communication apparatus in an embodiment of the present application. The communication apparatus may be a base station. As shown in the figure, the communication apparatus may include a processor 601, a memory 602, a transceiver 603 and a bus interface 604.

The processor 601 is in charge of managing a bus architecture and usual processing. The memory 602 may store data used when the processor 601 executes an operation. The transceiver 603 is configured to receive and transmit data under control of the processor 601.

The bus architecture may include any quantity of interconnected buses and bridges, specifically linking various circuits of one or more processors represented by the processor 601 and a memory represented by the memory 602. The bus architecture may further link various other circuits of a peripheral device, a voltage stabilizer, a power management circuit and the like, which are well known in the art and will, therefore, not be further described herein. The bus interface provides an interface. The processor 601 is in charge of managing the bus architecture and usual processing, and the memory 602 may store data used when the processor 601 executes the operation.

The flow disclosed in the embodiment of the present application may be applied to the processor 601 or implemented by the processor 601. In an implementation process, all steps of a signal processing flow may be completed through an integrated logic circuit of hardware in the processor 601 or an instruction in a form of software. The processor 601 may be a general-purpose processor, a digital signal processor, an application-specific integrated circuit, a field-programmable gate array or other programmable logic devices, a discrete gate or transistor logic device, and a discrete hardware component and can realize or execute all methods, steps and logic block diagrams disclosed in the embodiment of the present application. The general-purpose processor may be a microprocessor or any conventional processor, etc. Steps of the method disclosed by the embodiments of the present application may be directly embodied by being executed and completed by a hardware processor, or executed and completed by a combination of a hardware device and a software device in the processor. The software device may be located in a mature storage medium such as a random access memory, a flash memory, a read-only memory, a programmable read-only memory or an electrically erasable programmable memory, a register, etc. in the art. The storage medium is located in the memory 602. The processor 601 reads information in the memory 602 and completes the steps of the signal processing flow in combination with its hardware.

In one embodiment, the processor 601 is configured to read a computer instruction in the memory 602 and execute:

determining a terminal needing to wake up; and sending, through the transceiver and a PDCCH, wake-up indication information to the terminal on physical downlink control channel (PDCCH) monitor occasions configured for the terminal, and the wake-up indication information instructs the terminal to wake up.

In one embodiment, the processor 601 is further configured to:

determine the terminal needing to wake up in a terminal group; and send, through the transceiver and the PDCCH, the wake-up indication information to the terminal needing to wake up in the terminal group on the PDCCH monitor occasions configured for the terminal, and the wake-up indication information instructs the terminal to wake up.

In one embodiment, the processor 601 is further configured to:

determine a terminal needing to sleep in the terminal group; and send, through the transceiver and the PDCCH, GTS indication information to the terminal needing to sleep in the terminal group on the PDCCH monitor occasions configured for the terminal group, and the GTS indication information instructs the terminal needing to sleep to sleep.

In one embodiment, the processor 601 is further configured to:

send, through the transceiver and the PDCCH, first downlink control information (DCI) and second DCI to the terminals in the terminal group;

the first DCI includes a first information field, the first information field include subfields, each subfield corresponds to one terminal in the terminal group, a value of a subfield to which the terminal needing to wake up corresponds is equal to a value of the wake-up indication information, and a value of a subfield to which the terminal needing to sleep corresponds is equal to a value of the GTS indication information;

the second DCI includes a second information field, the second information field includes subfields, a quantity of subfields included in the second information field is smaller than or equal to a quantity of terminals needing to wake up in the terminal group, each subfield in the second information field corresponds to one terminal needing to wake up in the terminal group, and the each subfield is configured to carry indication information of resource information configured for the one terminals needing to wake up.

In one embodiment, the base station sends the first DCI and the second DCI by using different aggregation levels.

In one embodiment, the processor 601 is further configured to:

determine, for at least one terminal group, that all the terminals in the at least one terminal group needing to wake up, or that all the terminals in the at least one terminal group needing to sleep; and send, through the transceiver and the PDCCH, the first DCI to the terminal in the at least one terminal group;

the first DCI includes a first information field, the first information field includes at least one subfield, one subfield corresponds to one terminal group in the at least one terminal group, the at least two subfields in the first information field carry the wake-up indication information or the GTS indication information, the wake-up indication information carried by one subfield instructs all the terminals in a terminal group corresponding to the one subfield to wake up, and the GTS indication information carried by another one subfield instructs all the terminals in a terminal group corresponding to the another one subfield to sleep.

In one embodiment, the processor 601 is further configured to:

send, through the transceiver, indication information of a quantity of discontinuous reception (DRX) cycles on the PDCCH monitor occasions configured for the terminal.

Embodiments of the present application further provide a communication apparatus.

Figure 7:
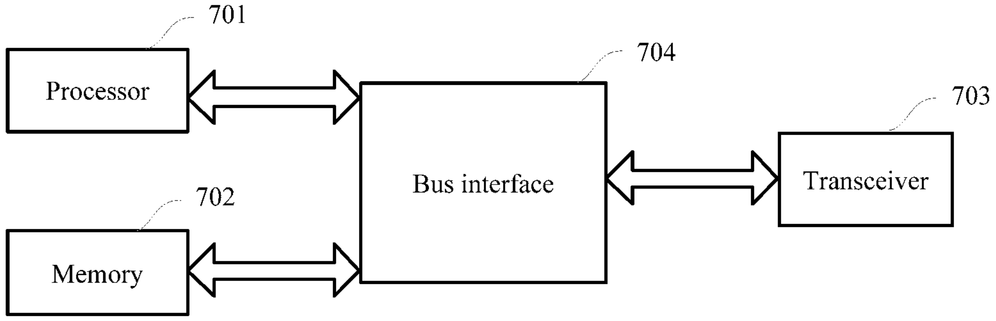
FIG. 7 is a schematic structural diagram of a communication apparatus provided by another embodiment of the present application.

FIG. 7 exemplarily illustrates a schematic structural diagram of a communication apparatus in an embodiment of the present application. The communication apparatus may be a terminal. As shown in the figure, the communication apparatus may include a processor 701, a memory 702, a transceiver 703 and a bus interface 704.

The processor 701 is in charge of managing a bus architecture and usual processing. The memory 702 may store data used when the processor 701 executes an operation. The transceiver 703 is configured to receive and transmit data under control of the processor 701.

The bus architecture may include any quantity of interconnected buses and bridges, specifically linking various circuits of one or more processors represented by the processor 701 and a memory represented by the memory 702. The bus architecture may further link various other circuits of a peripheral device, a voltage stabilizer, a power management circuit and the like, which are well known in the art and will, therefore, not be further described herein. The bus interface provides an interface. The processor 701 is in charge of managing the bus architecture and usual processing, and the memory 702 may store data used when the processor 701 executes the operation.

The flow disclosed in the embodiments of the present application may be applied to the processor 701 or implemented by the processor 701. In an implementation process, all steps of a signal processing flow may be completed through an integrated logic circuit of hardware in the processor 701 or an instruction in a form of software. The processor 701 may be a general-purpose processor, a digital signal processor, an application-specific integrated circuit, a field-programmable gate array or other programmable logic devices, a discrete gate or transistor logic device, and a discrete hardware component and can realize or execute all methods, steps and logic block diagrams disclosed in the embodiments of the present application. The general-purpose processor may be a microprocessor or any conventional processor, etc. Steps of the method disclosed by the embodiments of the present application may be directly embodied by being executed and completed by a hardware processor, or executed and completed by a combination of a hardware device and a software device in the processor. The software device may be located in a mature storage medium such as a random access memory, a flash memory, a read-only memory, a programmable read-only memory or an electrically erasable programmable memory, a register, etc. in the art. The storage medium is located in the memory 702. The processor 701 reads information in the memory 702 and completes the steps of the signal processing flow in combination with its hardware.

In one embodiment, the processor 701 is configured to read a computer instruction in the memory 702 and execute:

receiving, through the transceiver and a PDCCH, wake-up indication information sent by a base station on physical downlink control channel (PDCCH) monitor occasions configured for a terminal; and performing PDCCH monitoring according to the wake-up indication information.

In one embodiment, the processor 701 is further configured to:

give up PDCCH monitoring in the following one or more DRX cycles if the communication apparatus does not receive, through the PDCCH, the wake-up indication information and/or GTS indication information sent by the base station on the PDCCH monitor occasions configured for the terminal.

In one embodiment, the processor 701 is further configured to:

receive, through the transceiver and the PDCCH, the GTS indication information sent by the base station on the PDCCH monitor occasions configured for the terminal; and give up PDCCH monitoring in the following one or more DRX cycles according to the GTS indication information.

In one embodiment, the processor 701 is further configured to:

obtain, according to a location of the terminal in a terminal group to which the terminal belongs, the wake-up indication information carried by a subfield in a first information field of first DCI sent by the base station through the PDCCH, and the first DCI includes the first information field, the first information field includes subfields, each subfield corresponds to one terminal in the terminal group, a value of a subfield to which a terminal needing to wake up corresponds is equal to a value of the wake-up indication information, and a value of a subfield to which a terminal needing to sleep corresponds is equal to a value of the GTS indication information.

In one embodiment, the processor 701 is further configured to:

receive, through the PDCCH, indication information of resource information sent by the base station on the PDCCH monitor occasions configured for the terminal, and perform configuration according to the indication information of the resource information.

In one embodiment, the processor 701 is further configured to:

receive, through the PDCCH, indication information of a quantity of discontinuous reception (DRX) cycles sent by the base station on the PDCCH monitor occasions configured for the terminal, and monitor the PDCCH in a corresponding quantity of the following DRX cycles according to the indication information of the quantity of the DRX cycles.

The embodiments of the present application further provide a computer readable storage medium. The computer readable storage medium stores a computer executable instruction, and the computer executable instruction is configured to make a computer execute the method executed by a base station in the above embodiments.

The embodiments of the present application further provide a computer readable storage medium. The computer readable storage medium stores a computer executable instruction, and the computer executable instruction is configured to make a computer execute the method executed by the terminal in the above embodiments.

The present application is described with reference to flowcharts and/or block diagrams of the method, the device (system) and a computer program product according to the embodiments of the present application. It should be understood that each flow and/or block in the flowcharts and/or block diagrams and a combination of flows and/or blocks in the flowcharts and/or block diagrams may be realized through computer program instructions. These computer program instructions may be provided for a processor of a general-purpose computer, a special-purpose computer, an embedded processor or other programmable data processing devices to generate a machine, and the instructions executed by the processor of the computer or other programmable data processing devices may generate an apparatus for realizing specified functions in one or more flows in the flowcharts and/or one or more blocks in the block diagrams.

These computer program instructions may be also stored in a computer readable memory to guide the computer or other programmable data processing devices to work in a specific mode, and the instructions stored in the computer readable memory generate a product including an instruction apparatus, and the instruction apparatus realizes the specified functions in one or more flows of the flowcharts and/or one or more blocks of the block diagrams.

These computer program instructions may be also loaded into the computer or other programmable data processing devices, and a series of operation steps may be executed on the computer or other programmable devices to generate processing realized by the computer, and thus the instructions executed on the computer or other programmable devices provide steps for realizing the specified functions in one or more flows of the flowcharts and/or one or more blocks of the block diagrams.

What is claimed is:

1. An energy-saving indication method, comprising:

determining, by a base station, a terminal needing to wake up or to sleep in a terminal group; and sending, by the base station through a physical downlink control channel (PDCCH), wake-up indication information and indication information of resource information configured for one or more terminals needing to wake up in the terminal group to the terminal needing to wake up in the terminal group on PDCCH monitor occasions configured for the terminal, wherein the wake-up indication information instructs the terminal to wake up; or sending, by the base station through the PDCCH, Go-To-Sleep (GTS) indication information to the terminal needing to sleep in the terminal group on the PDCCH monitor occasions configured for the terminal group, wherein the GTS indication information instructs the terminal to sleep;

wherein the method further comprises: sending, by the base station through the PDCCH, first downlink control information (DCI) and second DCI to the terminals in the terminal group; wherein the first DCI comprises a first information field, the first information field comprises a plurality of subfields, each of the plurality of subfields corresponds to one or more terminals in the terminal group, a value of a subfield to which the terminal needing to wake up corresponds is equal to a value of the wake-up indication information, and a value of a subfield to which the terminal needing to sleep corresponds is equal to a value of the GTS indication information; and the second DCI comprises a second information field, the second information field comprises a plurality of subfields, a quantity of the plurality of subfields comprised in the second information field is smaller than or equal to a quantity of the one or more terminals needing to wake up in the terminal group, each subfield in the second information field corresponds to one or more terminals needing to wake up in the terminal group, and the each subfield is configured to carry the indication information of resource information configured for the one or more terminals needing to wake up.

2. The method according to claim 1, wherein before the determining, by the base station, the terminal needing to wake up or to sleep in the terminal group, the method further comprises:

informing, by the base station through high-level signaling, the terminal that the base station instructs the terminal to wake-up or to sleep in an explicit way or an implicit way.

3. The method according to claim 1, wherein:

the determining, by the base station, the terminal needing to wake up comprises:

determining, by the base station for at least one terminal group, all terminals in the at least one terminal group needing to wake up, or all terminals in the at least one terminal group needing to sleep; and the sending, by the base station through the PDCCH, the wake-up indication information to the terminal needing to wake up comprises:

sending, by the base station through the PDCCH, the first DCI to the terminals in the at least one terminal group; wherein the first DCI comprises a first information field, the first information field comprises at least one subfield, one subfield corresponds to one terminal group in the at least one terminal group, at least two subfields in the first information field carry the wake-up indication information or the GTS indication information, the wake-up indication information carried by one subfield of the at least two subfields instructs all terminals in a terminal group corresponding to the one subfield to wake up, and the GTS indication information carried by another one subfield of the at least two subfields instructs all terminals in a terminal group corresponding to the another one subfield to sleep.

4. The method according to claim 1, further comprising:

sending, by the base station, indication information of a quantity of discontinuous reception (DRX) cycles on the PDCCH monitor occasions configured for the terminal.

5. An energy-saving indication method, comprising:

receiving, by a terminal through a physical downlink control channel (PDCCH), wake-up indication information and indication information of resource information configured for the terminal needing to wake up sent by a base station on PDCCH monitor occasions configured for the terminal, or receiving, by the terminal through the PDCCH, Go-To-Sleep (GTS) indication information sent by the base station on the PDCCH monitor occasions configured for the terminal; wherein the wake-up indication information instructs the terminal to wake up, and the GTS indication information instructs the terminal to sleep; and performing, by the terminal, PDCCH monitoring according to the wake-up indication information, or giving up, by the terminal, PDCCH monitoring in following one or more discontinuous reception (DRX) cycles according to the GTS indication information;

wherein the terminal is a terminal in a terminal group;

wherein the method further comprises:

obtaining, by the terminal according to its location in the terminal group to which the terminal belongs, the wake-up indication information carried by a subfield in a first information field of first downlink control information (DCI) sent by the base station through the PDCCH; and determining to wake up, by the terminal according to a location of the terminal among all terminals needing to wake up in the terminal group, a subfield to which the terminal corresponds in a second information field in second DCI sent by the base station through the PDCCH; and obtaining the indication information of resource information configured for the terminal, carried by the subfield; wherein the first DCI comprises the first information field, the first information field comprises a plurality of subfields, each of the plurality of subfields corresponds to one or more terminals in the terminal group, a value of a subfield to which the terminal needing to wake up corresponds is equal to a value of the wake-up indication information, and a value of a subfield to which a terminal needing to sleep corresponds is equal to a value of GTS indication information;

the second DCI comprises the second information field, the second information field comprises a plurality of subfields, a quantity of the plurality of subfields comprised in the second information field is smaller than or equal to a quantity of one or more terminals needing to wake up in the terminal group, each subfield in the second information field corresponds to the one or more terminals needing to wake up in the terminal group, and the each subfield is configured to carry the indication information of resource information configured for the one or more terminals needing to wake up.

6. The method according to claim 5, further comprising: giving up, by the terminal, PDCCH monitoring in following one or more DRX cycles if the terminal does not receive, through the PDCCH, the wake-up indication information and/or the GTS indication information sent by the base station on the PDCCH monitor occasions configured for the terminal.

7. The method according to claim 5, further comprising: performing, by the terminal, configuration according to the indication information of the resource information.

8. The method according to claim 5, further comprising: receiving, by the terminal through the PDCCH, indication information of a quantity of DRX cycles sent by the base station on the PDCCH monitor occasions configured for the terminal; and monitoring, by the terminal, the PDCCH in a corresponding quantity of the following DRX cycles according to the indication information of the quantity of the DRX cycles.

9. A communication apparatus, comprising: a processor, a memory and a transceiver, wherein the processor is configured to read a computer instruction in the memory so as to execute the method of claim 5.

10. The communication apparatus according to claim 9, wherein the processor is further configured to:

give up PDCCH monitoring in following one or more DRX cycles if the communication apparatus does not receive, through the PDCCH, the wake-up indication information and/or the GTS indication information sent by the base station on the PDCCH monitor occasions configured for the terminal.

11. The communication apparatus according to claim 9, wherein the processor is further configured to:

receive high-level signaling sent by the base station for informing the base station to instruct the terminal to wake-up or to sleep in an explicit way or an implicit way before receiving, through the PDCCH, the wake-up indication information or the GTS indication information.

12. The method according to claim 5, before the receiving, by the terminal through the PDCCH wake-up indication information or GTS indication information, the method further comprises:

receiving, by the terminal, high-level signaling sent by the base station for informing the base station to instruct the terminal to wake-up or to sleep in an explicit way or an implicit way.

13. A communication apparatus, comprising; a processor, a memory and a transceiver, wherein the processor is configured to read a computer instruction in the memory so as to execute:

determining a terminal needing to wake up or to sleep in a terminal group; and sending, through the transceiver and a physical downlink control channel (PDCCH), wake-up indication information and indication information of resource information configured for one or more terminals needing to wake up in the terminal group to the terminal needing to wake up in the terminal group on PDCCH monitor occasions configured for the terminal, wherein the wake-up indication information instructs the terminal to wake up; or send, through the transceiver and the PDCCH, Go-To-Sleep (GTS) indication information to the terminal needing to sleep in the terminal group on the PDCCH monitor occasions configured for the terminal group, wherein the GTS indication information instructs the terminal to sleep;

wherein the processor is further configured to: send, through the transceiver and the PDCCH, first downlink control information (DCI) and second DCI to the terminals in the terminal group; wherein the first DCI comprises a first information field, the first information field comprises a plurality of subfields, each of the plurality of subfields corresponds to one or more terminals in the terminal group, a value of a subfield to which the terminal needing to wake up corresponds is equal to a value of the wake-up indication information, and a value of a subfield to which the terminal needing to sleep corresponds is equal to a value of the GTS indication information; and the second DCI comprises a second information field, the second information field comprises a plurality of subfields, a quantity of the plurality of subfields comprised in the second information field is smaller than or equal to a quantity of the one or more terminals needing to wake up in the terminal group, each subfield in the second information field corresponds to one terminal needing to wake up in the terminal group, and the each subfield is configured to carry the indication information of resource information configured for the one or more terminals needing to wake up.

14. The communication apparatus according to claim 13, wherein the processor is configured to:

determine, for at least one terminal group, all terminals in the at least one terminal group needing to wake up, or all terminals in the at least one terminal group needing to sleep; and send, through the transceiver and the PDCCH, the first DCI to the terminals in the at least one terminal group; wherein the first DCI comprises a first information field, the first information field comprises at least one subfield, one subfield corresponds to one terminal group in the at least one terminal group, at least two subfields in the first information field carry the wake-up indication information or the GTS indication information, the wake-up indication information carried by one subfield of the at least two subfields instructs all terminals in a terminal group corresponding to the one subfield to wake up, and the GTS indication information carried by another one subfield of the at least two subfields instructs all terminals in a terminal group corresponding to the another one subfield to sleep.

15. The communication apparatus according to claim 13, wherein the processor is further configured to:

send, through the transceiver, indication information of a quantity of discontinuous reception (DRX) cycles on the PDCCH monitor occasions configured for the terminal.

16. The communication apparatus according to claim 13, wherein the processor is configured to:

inform the terminal that a base station instructs the terminal to wake-up or to sleep in an explicit way or an implicit way through high-level signaling before determining the terminal needing to wake up or to sleep in the terminal group.

* * * * *